US009932117B1

(12) United States Patent
Grenga (10) Patent No.: US 9,932,117 B1
(45) Date of Patent: Apr. 3, 2018

(54) 4-BAR SIDE CANOPY RELEASE (71) Applicant: The United States of America as Represented by the Secretary of the Army, Washington, DC (US)

(72) Inventor: Todd Grenga, Cumberland, RI (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 221 days.

(21) Appl. No.: 14/945,799

(22) Filed: Nov. 19, 2015

(51) Int. Cl.
B64D 17/32 (2006.01)
B64D 17/38 (2006.01)
B64D 17/70 (2006.01)

(52) U.S. Cl.
CPC ............. B64D 17/70 (2013.01); B64D 17/32 (2013.01); B64D 17/383 (2013.01)

(58) Field of Classification Search
CPC ....... B64D 17/32; B64D 17/38; B64D 17/383
See application file for complete search history.

(56) References Cited

U.S. PATENT DOCUMENTS

| 2,469,574 | A | * | 5/1949 | Quilter | B64D 17/32 24/598.1 |
| 2,924,405 | A | * | 2/1960 | Dalglish | B64D 17/32 24/580.1 |
| 2,994,118 | A | * | 8/1961 | Lawhead | B64D 17/32 24/598.1 |
| 3,141,215 | A | * | 7/1964 | Turolla | B64D 17/38 24/654 |
| 3,555,628 | A | * | 1/1971 | Brown | B64D 17/32 24/603 |
| 6,644,597 | B1 | | 11/2003 | Bahniuk | |
| 6,796,531 | B1 | | 9/2004 | Anderson et al. | |
| 7,313,848 | B2 | | 1/2008 | Forster et al. | |
| 2013/0175399 | A1 | | 7/2013 | Fitzgerald | |

FOREIGN PATENT DOCUMENTS

| FR | 2353308 A2 | * | 12/1977 | ............. B64D 17/38 |
| GB | 980586 A | * | 1/1965 | ............. B64D 17/32 |
| GB | 1171231 A | * | 11/1969 | ............. B64D 17/32 |

* cited by examiner

Primary Examiner — Richard R Green
(74) Attorney, Agent, or Firm — Roger C. Phillips (57) ABSTRACT A parachute canopy release assembly includes a frame assembly with first and second upstanding members. A latching member has a pivot end and a latch end, the pivot end pivotally coupled to a bottom portion of the first upstanding member. A riser bar has a pivot end and latch engaging end, the pivot end of the riser bar pivotally coupled to a top portion of the second upstanding member, the latch engaging end retained by the latch end of the latching member in the locked state. A release linkage assembly includes a lock member configured to transition from a first state to a second state, retain the latching member in a first position in the first, locked state and retain the latching member in a second position in the second, unlocked state.

11 Claims, 8 Drawing Sheets

4-BAR SIDE CANOPY RELEASE

STATEMENT OF GOVERNMENT INTEREST

The invention described herein may be manufactured and used by or for the U.S. Government for governmental purposes without the payment of any royalties thereon or therefor.

FIELD

The aspects of the present disclosure relate generally to the field of parachutes, and in particular to a laterally activated canopy release for a parachute.

BACKGROUND

Within the Department of Defense there is a mission to deliver a large number of soldiers to a forward position by parachute. The jumpers are equipped with harnesses and parachutes to slow their descent. All modern parachute systems have a means of separating the parachute from the harness for emergencies and continued execution of the mission once on the ground. The means of separation is called a parachute or canopy release assembly.

Parachute systems worn by the airborne soldier utilize a solid mechanical release. This release has been in the field in various forms since the 1950's. Existing releases such as these require a piece of metallic hardware to be sewn into the harness. Activation of the release permits the separation of a male fitting and female assembly. The female assembly is sewn into the harness and stays with the jumper. The male fitting is sewn to the parachute riser and leaves with the riser. This situation can result in a significantly sized piece of steel passing by the head and face of the jumper.

Sport jumpers use a 3-ring canopy release. The 3-ring canopy release is a series of three interlocking rings sewn onto the harness and riser which are closed by a nylon-coated steel ripcord. Each ring uses mechanical advantage to reduce the load held by the previous. The result is the potential to only need to restrain as little as 1/10 the load acting through the canopy riser. Other configurations of the ring style release exist in which the load reduction factor was attempted to be increased (4 and 5 ring assemblies).

The final closure of a multi-ring release is a textile loop held in place by a ripcord. When the ripcord is pulled free of the textile loop, the loop flexes and releases the smallest of the metallic rings. In turn, each ring releases the next successively larger ring until the riser is set free.

Past efforts have been made to include a multi-ring release into the Airborne Soldier harness system. Several factors make a multi-ring assembly attractive. However, due to the large variation in body sizes the harnesses have to fit, the ripcord method is not applicable.

Various constraints prevent the aforementioned devices to be available for activation in all conditions. One significant condition is the act of a jumper being dragged on their chest and stomach. The motion to activate the release would be blocked by the ground.

Accordingly, it would be desirable to provide a canopy release that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a parachute canopy release assembly having a locked state and an unlocked state. In one embodiment, the parachute canopy release assembly includes a frame assembly. The frame assembly has a first upstanding member and a second upstanding member. A latching member has a pivot end and a latch end, the pivot end of the latching member pivotally coupled to a bottom portion of the first upstanding member. A riser bar has a pivot end and latch engaging end. The pivot end of the riser bar is pivotally coupled to a top portion of the second upstanding member. The latch engaging end of the riser bar is retained by the latch end of the latching member in the locked state. A release linkage assembly includes a lock member configured to transition from a first state to a second state, the lock member configured to retain the latching member in a first position in the first state of the lock member and retain the latching member in a second position in the second state of the lock member. The first position of the latching member corresponds to the locked state of the parachute canopy release assembly and the second position corresponds to the unlocked state.

Another aspect of the disclosed embodiments is directed to a parachute canopy release assembly. In one embodiment, the assembly comprises a frame; a latch member pivotally coupled to the frame; a release linkage assembly pivotally coupled to the latch member, the release linkage assembly having a locked state and an unlocked state; a riser bar having a first end pivotally coupled to the frame and a second end configured to engage a latch end of the latch member in the locked state of the release linkage assembly. A cable is coupled to the release linkage assembly, wherein a force on the cable moves the release linkage assembly from the locked state to the unlocked state, the movement of the release linkage assembly generating a corresponding movement of the latch end of the latch member, wherein movement of the latch end of the latch member releases the second end of the riser bar.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION OF THE EXEMPLARY EMBODIMENTS OF THE DISCLOSURE

Figure 1:
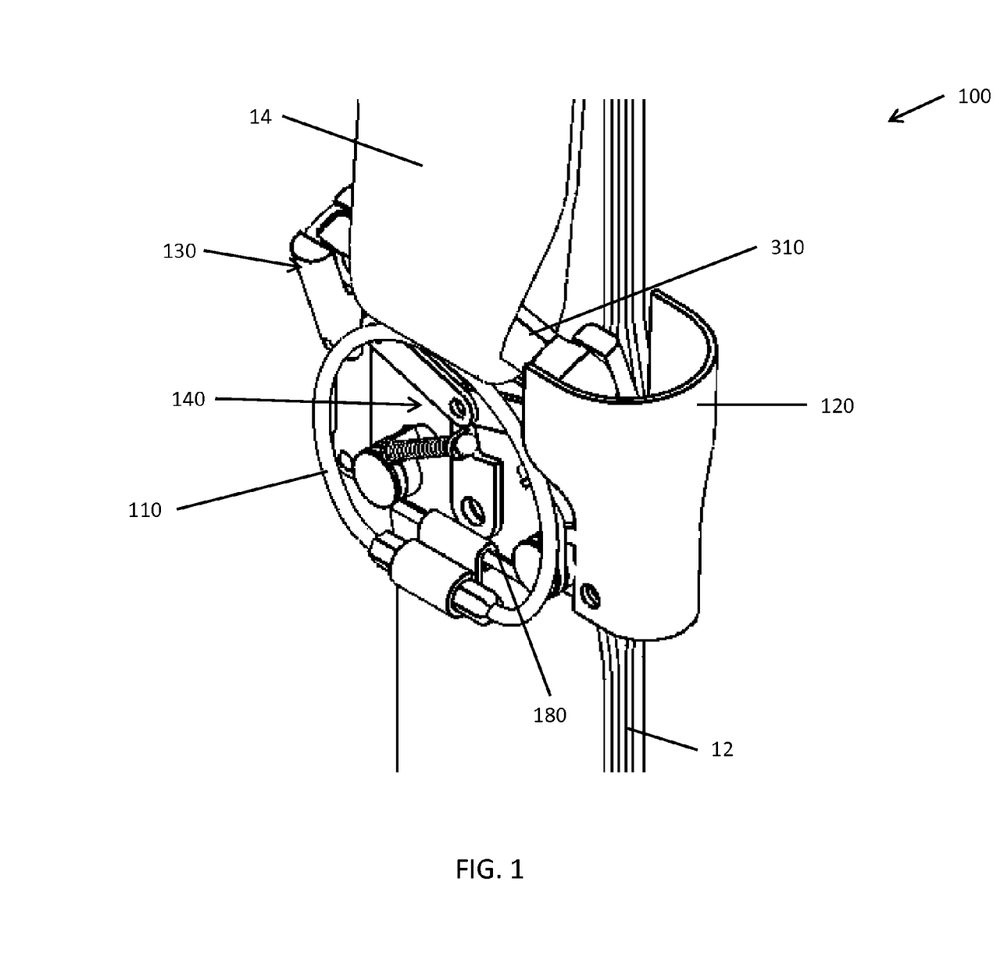
FIG. 1 illustrates a top perspective front view of a canopy release assembly incorporating aspects of the disclosed embodiments, the assembly being installed on the harness with the riser connected.

Referring to FIG. 1, a parachute canopy harness release assembly 100 incorporating aspects of the disclosed embodiments is illustrated. In this example, the canopy harness release assembly 100 is coupled to a harness portion 12 and a riser portion 14. The aspects of the disclosed embodiments provide a canopy release assembly that can be triggered in multiple directions and includes an interface that removes hardware from the riser. The assembly is held closed in its normal state and connects to an internal cable. Any force acting on that cable is transferred to an axial load that triggers the device. The result is a canopy release assembly that may be triggered from the front of the torso, as well as laterally, from the left or right of the torso. The canopy release of the disclosed embodiments also provides a bar that the riser engages around with no hardware sewn to the riser. Activation of the canopy release allows the riser to slide off one end of the bar.

The result is a canopy release assembly that can be triggered not only from the front of the torso, but also laterally, towards the left or right of the torso. Removing hardware from the riser advantageously minimizes that risk of hardware passing near the head of the user upon activation.

Figure 2:
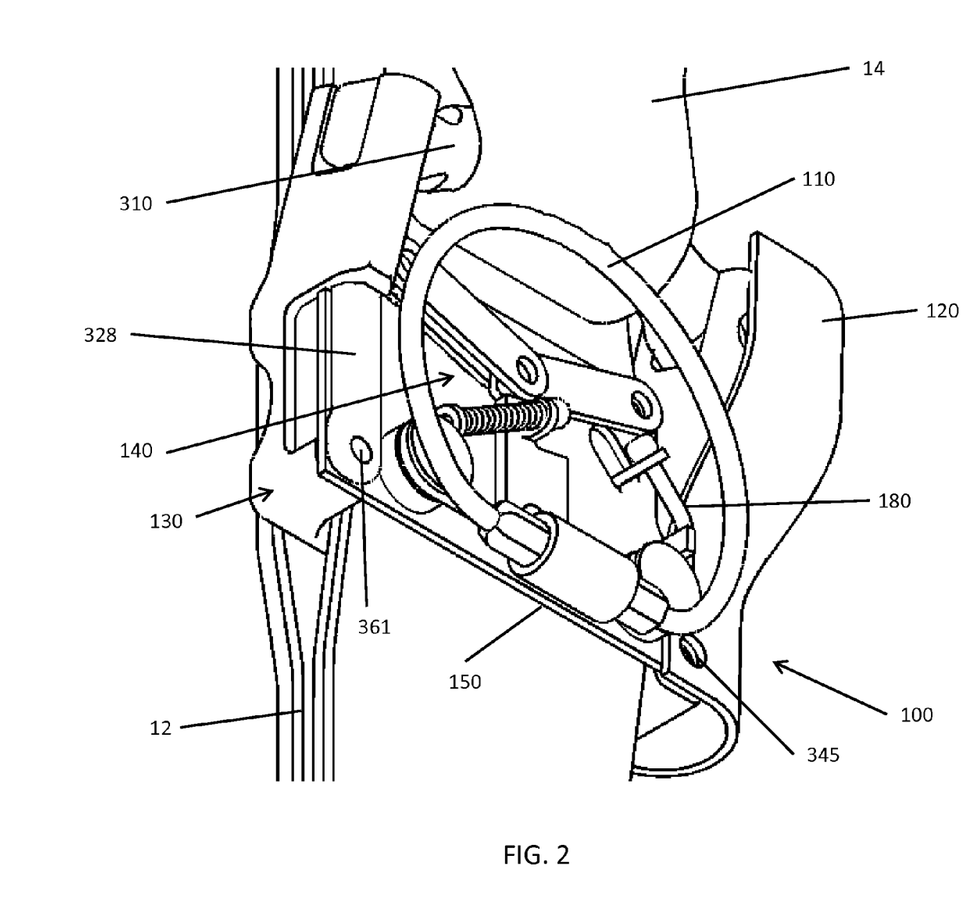
FIG. 2 illustrates a bottom perspective view of the canopy release assembly of FIG. 1.

FIGS. 1 and 2 illustrate perspective views of the canopy release assembly 100, installed on the harness 12 with the parachute riser 14 connected thereto. In one embodiment, the canopy release 100 incorporates a safety cover (not shown), which will prevent snagging of components that might lead to an inadvertent actuation.

As shown in FIG. 1, in one embodiment, the canopy release assembly 100 includes a forward facing or front pull release 110, a side release member or lever 120, a base frame assembly 130 and a release linkage assembly 140. The front pull release 110, which in this example is in the form of a cable or lanyard, is disposed on a front portion of the canopy release assembly 100 relative to the torso of the user. The front pull release 110 is attached to the cable 180, also referred to as a pull cable, and is configured to trigger the canopy release assembly 100 when the front pull release 110 is pulled away from the front portion of the canopy release assembly 100.

The side lever 120 is disposed on a side portion of the canopy release assembly 100. In the embodiment of FIG. 1, the side lever 120 is disposed on the right side of the canopy release assembly 100. In alternate embodiments, the side lever 120 can be disposed on the left side of the canopy release assembly 100. The side lever 120 is configured to engage the pull cable 180 and trigger or activate the canopy release assembly 100 when a side or lateral activation is desired.

In the example of FIG. 1, the base frame assembly 130 is holding the riser bar 310 in the closed and locked position. The release linkage assembly 140 is configured to maintain the locked state of the base frame assembly 130 in a normal state of the canopy release assembly 100. When a force is applied to one of the front pull release or the side lever 120, the release linkage assembly 140 will unlock the base frame assembly 130, which will allow the riser bar 310 to unlock from the latched state or release. Thus, the canopy release assembly 100 can be triggered from multiple directions to change the state of the canopy release assembly 100 from locked to unlocked.

In the example of FIGS. 1-3 and 6, for example, the base frame assembly 130 is configured with an inherent bend to allow separation of the harness 12 and riser 14 connection points. This geometry provides for a compact design.

Figure 6:
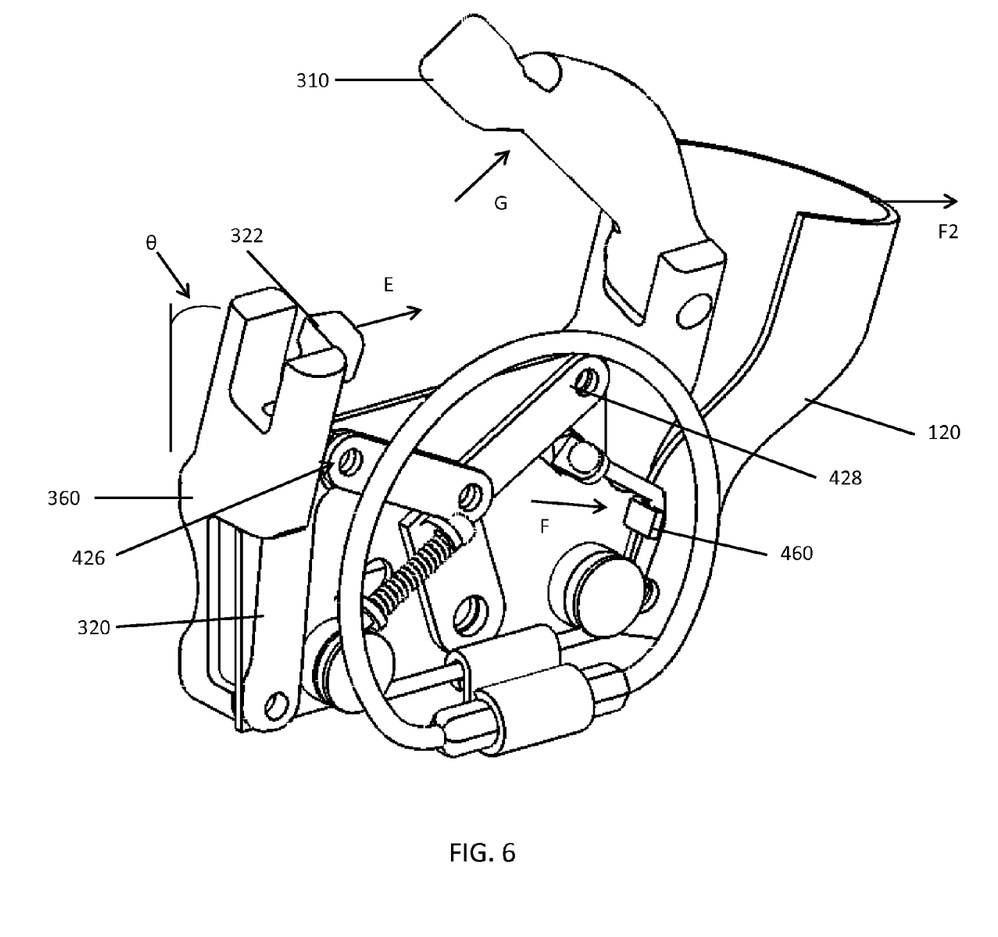
FIG. 6 illustrates the canopy release mechanism of FIG. 4 in an open and unlocked position, through the use of the side release activation lever.

As shown in FIG. 1, the riser 14 is positioned above (outside the harness 12, away from the torso) the harness 12. This example provides for the tightest fit of the webbing. To achieve this, the base frame assembly 130 needs to be constructed with an angular displacement of the harness 12 and riser 14 attachment points. The angular geometry is observable in FIGS. 2, 3 and 6, for example. In the example of FIG. 6, the angle θ is approximately 18.5 degrees. In alternate embodiments, any suitable angular geometry can be used that is subject to the overall length (height) of the base frame assembly 130. For example, if a shorter base frame assembly 130 is used, the angle θ needs to be greater than the exemplary 18.5 degrees. If the base frame assembly 130 is longer, the angle θ can be shallower than the exemplary 18.5 degrees.

Figure 3:
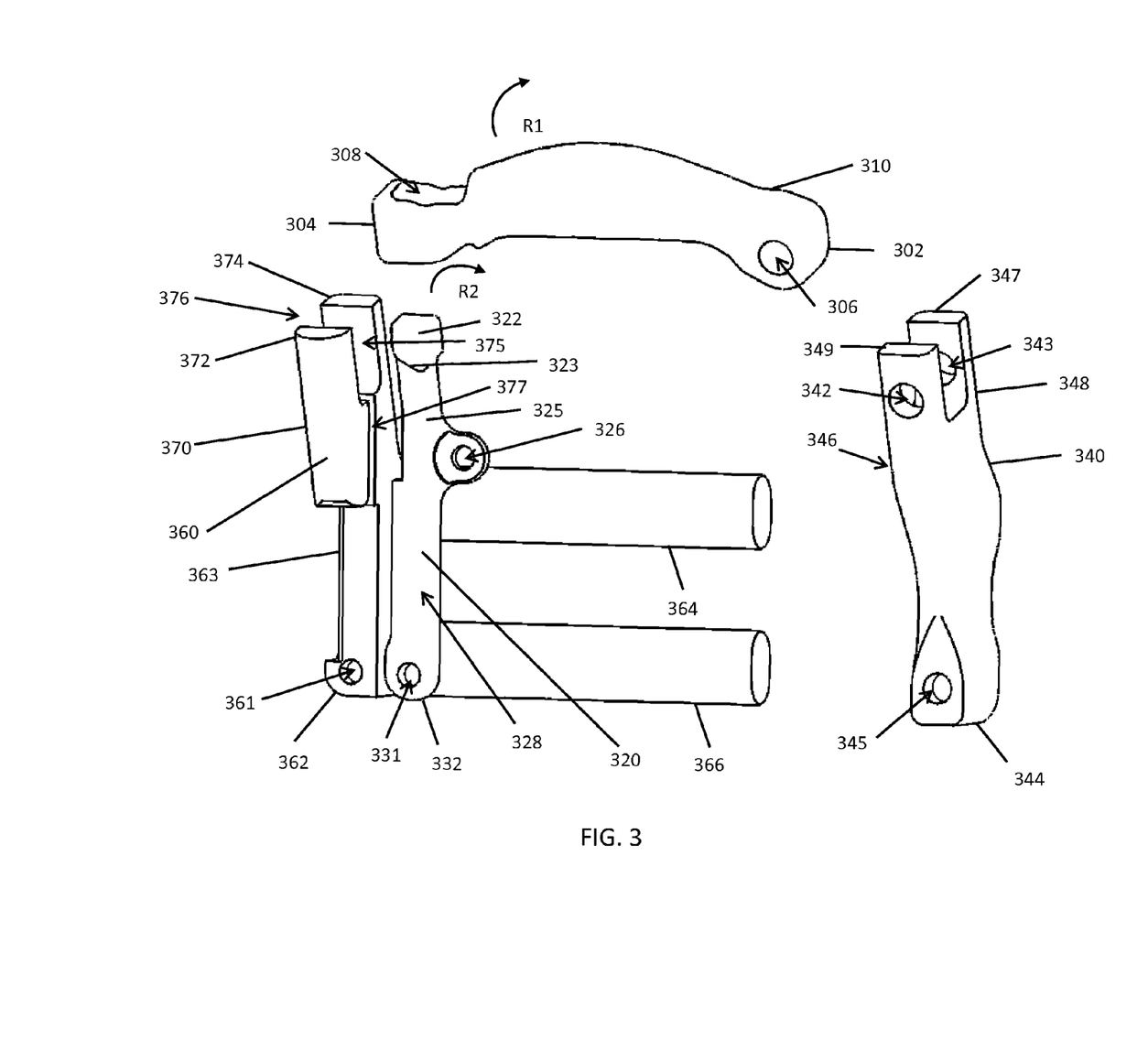
FIG. 3 illustrates an exploded plan view of the structural components of the base frame assembly for a canopy release assembly incorporating aspects of the disclosed embodiments.

FIG. 3 illustrates an exploded view of the structural components of the base frame assembly 130. As shown in FIG. 3, the base frame assembly 130 generally comprises the riser bar 310, a latch member 320, a frame bar member 340 and a base frame member 360. As shown in FIG. 3, the parts comprising the base frame assembly 130 are separable for ease of manufacturing and system repair. When the parts 320, 340, 360 of the base frame assembly 130 are coupled together, the latch member 320 and the riser bar 310 are configured to interface with each other and pivot independently of the base frame member 360.

The riser bar 310 includes a pivot end 302 and a latch engaging end 304. The pivot end 302 of the riser bar 310 is pivotally coupled to the frame bar member 340 at pivot point 342. The pivot point 342 of the frame bar member 340 generally comprises one or more openings. A pivot pin (not shown) can be inserted into the openings at pivot point 342, as well as opening 306 in the riser bar 310, to pivotally or rotatably couple the riser bar 310 to the frame bar member 340.

The latch engaging end 304 of the riser bar 310 engages the latch end 322 of the latch member 320. In one embodiment, the latch engaging end 304 of the riser bar 310 includes an opening 308. The opening 308 is suitably sized to slide over the latch end 322 of the latch member 320.

The base frame member 360 comprises an upstanding member 370 and two prong members or bars 364, 366. The prong members 364, 366 generally extend in a horizontal direction, substantially perpendicularly to the upstanding member 370 of the base frame member 360. The prong members 364, 366 are configured to interface into corresponding loops of the harness 12, as shown for example in FIG. 1. The base frame member 360 provides the primary connecting structure between the riser 14 and the harness 12.

An upper portion of the upstanding member 370 includes, or is bifurcated into, two upstanding portions 372, 374. An opening or recess 376 is formed between the portions 372, 374. The latch engaging end 304 of the riser bar 310 is configured to be received in the opening 376, between the portions 372, 374.

An upper portion 375 of the opening 376 is wider than a lower portion 377 of the opening 376. The opening 376 is configured to slidably receive the latch member 320. In the embodiment shown in FIG. 3, the latch end 322 of the latch member 320 is received in the upper portion 375 of the opening 376, while the section 325 of the latch member 320 is received in the lower portion 377. In one embodiment, the base frame member 360 includes a recessed portion 363. As shown in FIG. 2, the portion 328 of the latch member 320 occupies the recessed portion 363.

A lower end 362 of the base frame member 360 includes a pivot portion 361. The pivot portion 361 is configured to pivotally coupled to a pivot portion 331 in the lower end 332 of the latch member 320. A pivot member, such as a pin (not shown) can be inserted into the openings shown in the respective pivot portions 361, 331.

The frame bar 340 closes the base frame member 360 securely in place and provides a pivoting point 342 for the riser bar 310 as described above. An inside or interior facing portion 346 of the frame bar 340 includes two cavities (not shown), which are configured to receive or engage the prong members 364, 366 to secure the base frame member 360 to the frame bar 340. The upper portion 348 of the frame bar 340 includes two upstanding members 347, 349. The end 302 of the riser bar 310 is configured to be pivotally retained in-between the two upstanding members 347, 349. The pivot points 342, 306 and 343 align and a pivot point (not shown) can be inserted to form the pivot connection. The lower end 344 of the frame bar 340 includes a pivot point 345, which is used to couple the frame bar 340 to the base plate 150 and the side release 120, as is described below.

The latch member 320 includes the upper or latch end 322 and the lower end 332. The lower end 332 is pivotally coupled to the lower end 362 of the base frame member 360. The upper or latch end 322 of the latch member 320 is configured be received in the opening 308 of the riser bar 310. The latch member 320 also includes a pivot point 326. The pivot point 326 serves as the interface point with the release linkage assembly 140, as will be described below.

The riser bar 310 is configured to connect to or couple with the parachute riser 14 as shown in FIG. 1. The parachute riser 14 engages around the riser bar 310 with no hardware sewn to the parachute riser 14. Activation of the canopy release assembly 100 as described herein allows the parachute riser 14 to freely slide off the end 304 of the riser bar 310. Thus, there is no hardware moving in the direction of the user's head or face when the canopy release assembly 100 activates and the parachute riser 14 is released.

In one embodiment, a force acting on the riser bar 310, such as from the parachute riser 14, will bias the riser bar 310 to rotate. In the example of FIG. 3, the riser bar 310 is configured to rotate in a clockwise manner, as generally indicated by the arrow R1. The latch member 320 is configured to hold the riser bar 310 in the closed position and release the riser bar 310 by rotating inward, in the direction indicated by arrow R2. The engagement of the latch end 322 in the opening 308 of the riser bar 310, with the end 304 of the riser bar 310 in the opening 376 formed between members 372, 374 of the base frame member 360, prevents rotation of the riser bar 310 when the parachute canopy release assembly 100 is in the locked state.

Figure 4:
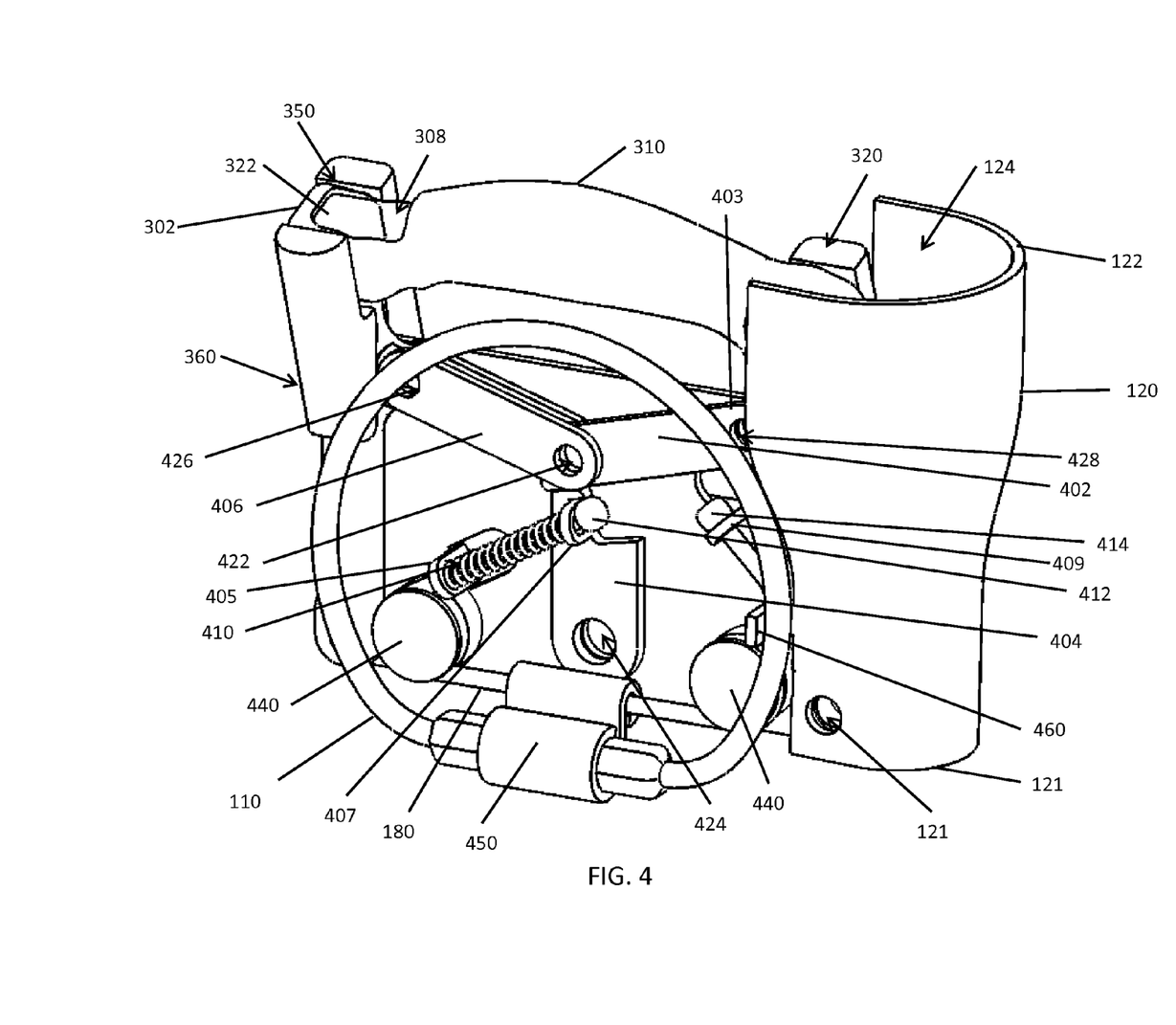
FIG. 4 illustrates a perspective view of the release linkage assembly for the canopy release assembly incorporating aspects of the disclosed embodiments.

FIG. 4 illustrates a perspective view of one embodiment of a canopy release assembly 100 incorporating aspects of the disclosed embodiments. In this example, the elements of the release linkage assembly 140 are illustrated. The release linkage assembly 140 is configured to maintain the canopy release assembly 100 in a locked state and unlock or release the riser bar 310 when an axial force is applied to the release cable 180 by activation or movement of the front pull release 110 or the side release lever 120.

Figure 5:
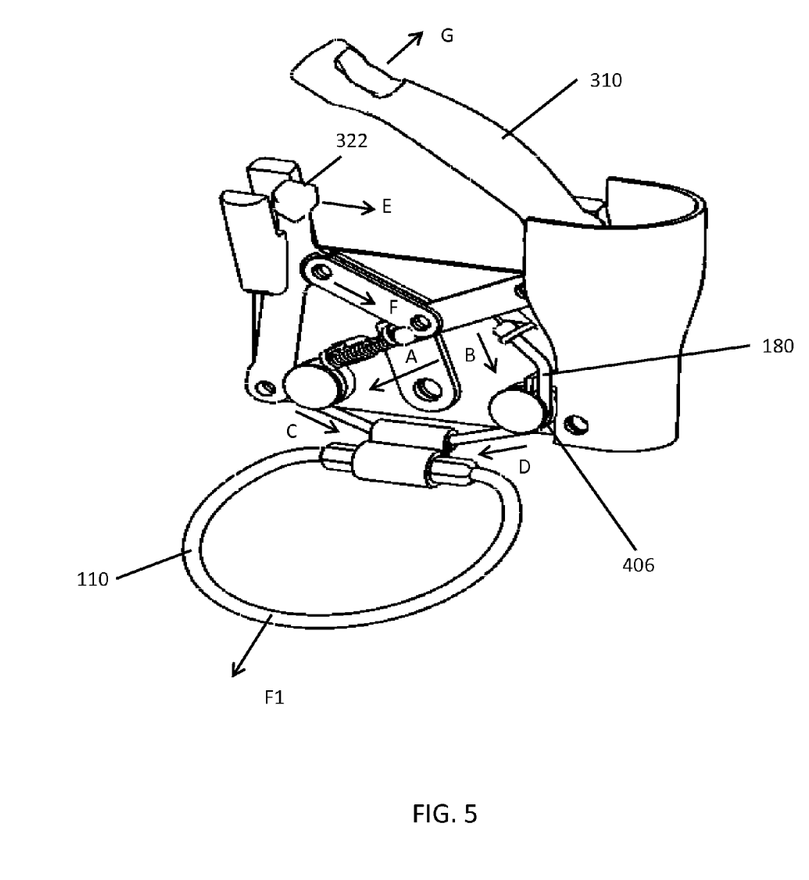
FIG. 5 illustrates the canopy release mechanism of FIG. 4 in an open and unlocked position, through the use of the front pull cable release.

In the embodiment shown in FIG. 4, the linkage assembly 140 comprises a lock link member 402, a lock member 404, and a follower link member 406. The canopy release assembly 100 and linkage assembly 140 shown in FIGS. 1, 2, and 4 is in a locked state, while FIGS. 5 and 6 illustrate the canopy release assembly 100 and linkage assembly 140 in an unlocked state.

As shown in the example of FIG. 4, the follower link 406 includes a pivot point or connection 426. The follower link 406 is pivotally connected to the latch member 320 of FIG. 3 at pivot point 426. The pivot point 426, or opening, aligns with the opening or pivot point 326 shown in FIG. 3. A pin member (not shown) or other suitable connection member can be used to pivotally couple the latch member 320 and the follower link 406 through pivot points 426, 326.

The follower link 406 and lock link 402 are pivotally coupled together at pivot point 422. The follower link 406 only functions to connect or couple the lock link 402 with the latch member 320. The rotational movement of the lock member 404, as is described below, generates a movement of the follower link 406, which results in movement of the latch member 320 to release the riser bar 310.

The lock link member 402 is pivotally coupled at its other end 403 to the base plate 150. Opening 428 of the lock link member 402 generally aligns with a corresponding opening in the base plate 150. A suitable pin member can be inserted in or through the opening 428 and to the base plate 150 to create the pivot connection.

The ability of the latch member 320 to move or rotate is limited by the position of the lock link member 402 and the follower link 406. If the lock link member 402 cannot move, the position of the latch member 320 is fixed.

The lock link member 402 is held in place or position by the lock member 404. When the parachute canopy release assembly 100 is in the locked position, the lock link member 402 is restricted from rotating. A spring 410, retained between tab members 405, 407 on the cable 180, biases the lock member 404 into the locked position, as is shown in the example of FIG. 4.

The release cable 180 is anchored to the base plate 150 and the lock member 404. As is shown in FIGS. 4-6, one end 412 of the release cable 180 is coupled to the lock member 404. The other end 414 is coupled to the base plate 150. Tab members 407 and 409 are used to retain the ends of the release cable. In one embodiment, each end of the release cable 180 can include a head portion. The head portion will be larger than an opening in the respective tab members 407, 409 and each end of the release cable 180 restrained.

A non-axial pull along the release cable 180 will result in an axial load that acts against the spring 410 that biases the lock member 404. This configuration allows for a significant number of directions for release activation, including a forward pull direction or sideways pull direction.

Figure 7:
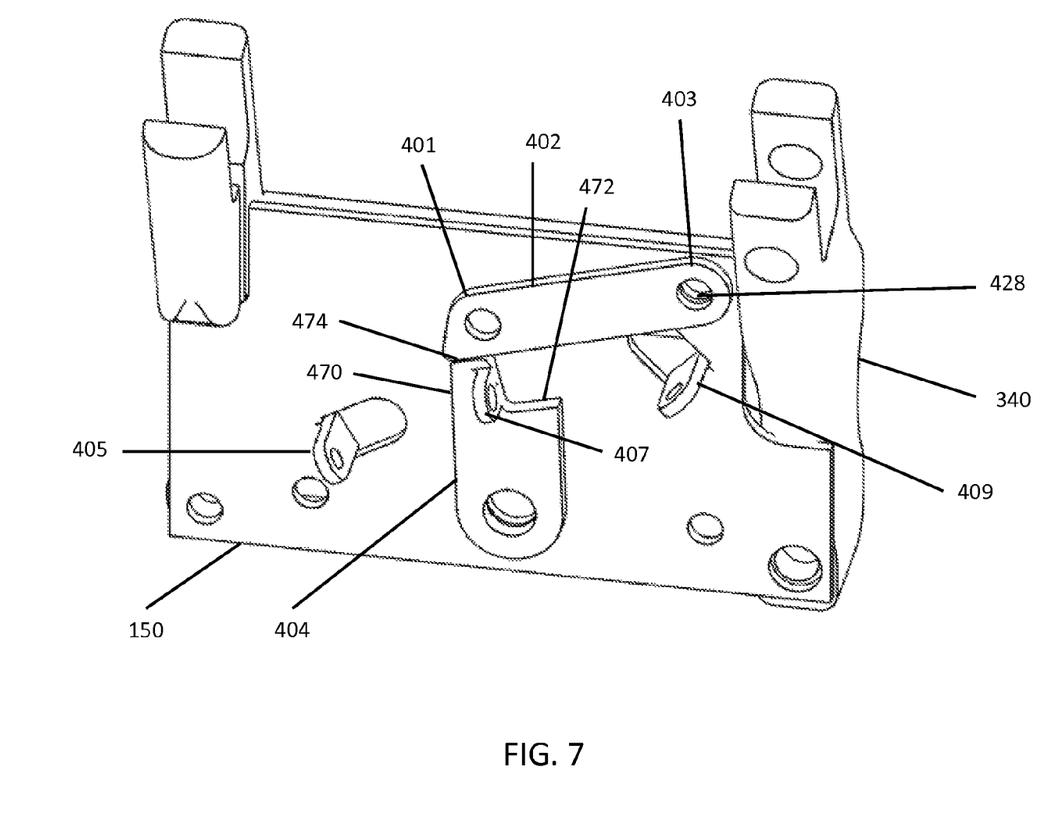
FIG. 7 illustrates aspects of the release linkage assembly according to the disclosed embodiments.
Figure 8:
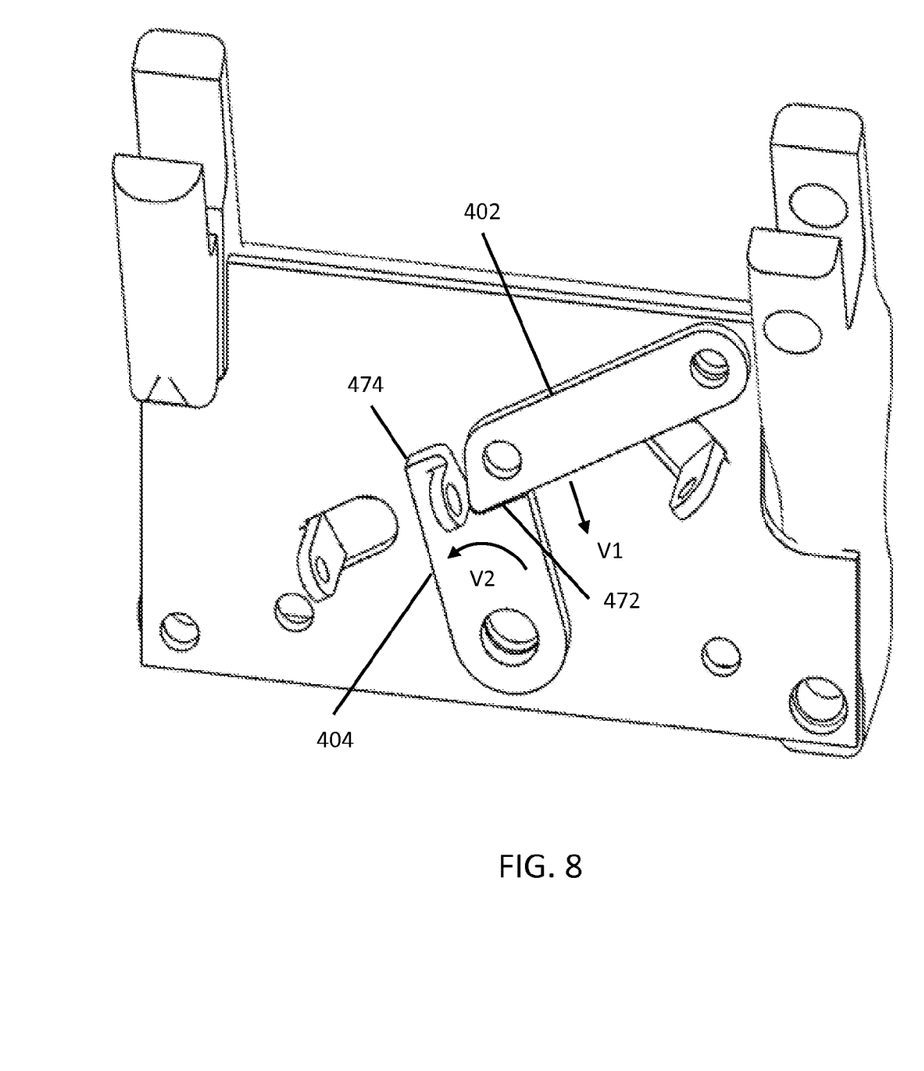
FIG. 8 illustrates aspects of the release linkage assembly according to the disclosed embodiments.

Referring to FIGS. 7 and 8, the upper end 470 of the lock member 404 has two surfaces 472, 474 for interfacing with the lock link member 402. The first surface 472 holds the lock link member 402 in a position where it and the follower link 406 prevent the latch member 320 from rotating. This is shown in FIG. 7 and corresponds to the locked position of the assembly 100.

Referring to FIG. 8, rotation of the lock member 404 in the direction V1 switches engagement of the lock link member 402 to the second surface 472. The second surface 472 acts to limit the range of motion of the lock link member 402 as it moves in the direction V2. The motion of the lock link member 402 in the direction V2, adjusts the geometry between the follower link 406 and latch member 320. The motion of the lock link member 402 and the corresponding movement of the follower link member 406 allows the latch 320 to rotate clockwise, or in the direction E as shown in FIG. 5.

As the latch member 320 rotates in the direction E, in one embodiment, the latch end 322 shifts to a larger cavity portion of the opening 308 of the riser bar 310. This allows the riser bar 310 to rotate in the direction G to the open position as is shown in FIG. 5.

In one embodiment, a size of the opening 308 is larger in the direction E, which allows the latch head or end 322 to release from the opening 308. In an alternate embodiment, the latch end 322 can include a surface engaging portion 323. The surface engaging portion 323 engages a corresponding surface or flange in the opening 308. When the latch member 320 and latch end 322 moves in the direction E, the surface engaging portion 323 disengages or slides off the corresponding surface in the opening and is released.

The connection point 350 between the end 302 of the riser bar 310 and the latch 320, in opening 308, is configured to allow the riser bar 310 to motivate the latch end 322 inward. In a situation where the canopy release is most critical, the riser 14 will be applying a tensile load to the riser bar 310. With both ends of the riser bar 310 restrained, the riser force would be transferred through the frame bars 364, 366 into the harness 12. Applying a force onto the release cable 180 will cause the lock member 404 to rotate counter-clockwise as is illustrated in FIG. 5 and release the end 304 of the riser bar 310.

As shown in FIG. 4, the release cable 180 is routed along a bottom portion of the linkage assembly 140. Guide members 440 are used to provide a routing of the release cable 180. In one embodiment, the guide members 440 include channels within which the release cable 180 is movably retained.

The front pull release 110 is coupled to the release cable 180 via a clamping member 450. The clamping member 450 secures the front pull release 110 to the release cable 180. When the front pull release 110 is pulled on, the force is transferred to the release cable 180. This activates the canopy release 100.

FIG. 5 illustrates the forward pull direction of release. In this example, the front pull release 110 is connected to the primary length of the release cable 180. A force on the pull cable 110, such as the force indicated by arrow F1 away from the center of the canopy release assembly 100 will create an axial tension in the release cable 180. This causes the lock member 404 to rotate in the counter-clockwise direction. The corresponding movement of the follower link 406 as is described herein shifts the latch end 322 in the direction E, which allows the riser bar 310 to move in the direction G.

The canopy release assembly 100 of the disclosed embodiments provides for lateral activation via the side release lever 120. This lateral activation will enable a jumper being dragged on their belly the ability to release the canopy.

When canopy release assembly 100 is in the closed condition, as is shown in FIG. 4, a tab 460 of the side release lever 120 sits or is disposed to the inside portion of the release cable 180. As shown in FIG. 4, the lower end 121 of the side release lever 120 is pivotally mounted to the frame bar 340. The end 344 of the frame bar 340 shown in FIG. 3 includes a pivot point, or opening 345, that generally aligns with the opening 121. A pin member (not shown) can be inserted into the openings 121, 345 to pivotally secure the side lever 120 to the frame bar 340.

As illustrated in FIG. 4, the upper end 122 of the side release lever 120 is sized to include a space or opening 124 to allow a finger, such as the index finger, to be inserted. Applying an outward force to the side release lever 120, such as the force indicated by arrow F2 applies a lateral force to the release cable 180 via the tab 460. An example of this is illustrated in FIG. 6. The force F2 results in the tab member 460 engaging the release cable 180 in the direction generally indicated by arrow F3. The movement of the release cable 180 moves the lock member 404, which results in activation of the canopy release assembly 100 and a release of the canopy as described herein with reference to FIGS. 4 and 5. This applied outward force action allows for activation of the side release lever 120 and canopy release assembly 100 in conditions where the safety cover (not shown) cannot be able to be opened or other conditions exist where a force cannot be applied to pull on the pull cable 110.

One important safety concern with a canopy release is an inadvertent release. The canopy release assembly 100 of the disclosed embodiments mitigates this risk by requiring two motions to activate the canopy release assembly 100. Both activation release methods, one using the pull release 110 and the other using the side release lever 120, require two steps. In one embodiment, the safety cover (not shown) covers—the front side and components of the canopy release assembly 110. To access the pull release 110, the safety cover needs to be opened. The use of the safety cover prevents or minimizes the risk of snagging or otherwise inadvertently applying a force to the pull release 110.

In one embodiment, the side release lever 120 is biased to its closed position, such as that shown in FIG. 4, by a spring (not shown). A separate catch (not shown) can be used to hold the side release lever 120 in the closed position. Inserting a finger into the opening 124 of the side release lever 120 will push the catch out of the way and allow the side release lever 120 to be pulled in the lateral direction to open.

The lateral release direction is configured to pull away from the center of the jumper's mass; pull left or right. Also, the riser bar 310 is configured to open outward. These two factors result in the need for distinct left and right assemblies.

The aspects of the disclosed embodiments are directed to a parachute canopy harness release that is based on the mechanical advantages of a four-bar linkage assembly. The configuration of the linkage in the canopy release assembly 100 of the disclosed embodiments allows for multiple directions of release and includes an interface that removes hardware from the riser.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A parachute canopy release assembly having a locked state and an unlocked state, the parachute canopy release assembly comprising:
    a frame assembly having a first upstanding member and a second upstanding member;
    a latching member having a pivot end and a latch end, the pivot end of the latching member pivotally coupled to a bottom portion of the first upstanding member;
    a riser bar having a pivot end and latch engaging end, the pivot end of the riser bar pivotally coupled to a top portion of the second upstanding member, the latch engaging end of the riser bar retained by the latch end of the latching member in the locked state;
    a release linkage assembly including a lock member configured to transition from a first state to a second state, the lock member configured to retain the latching member in a first position in the first state of the lock member and retain the latching member in a second position in the second state of the lock member, the first position of the latching member corresponding to the locked state of the parachute canopy release assembly and the second position corresponding to the unlocked state; and
    wherein the release linkage assembly comprises a follower link and a lock link member, a first end of the follower link pivotally coupled to a pivot point on the latch member and a second end of the follower link pivotally coupled to a first end of the lock link member, the lock link member engaging a first surface of the lock member in the first state of the lock member and a second surface of the lock member in the second state.

2. The parachute canopy release assembly of claim 1, comprising a cable having one end coupled to the lock member and configured to move the lock member from the first state to the second state when a force is applied to the cable.

3. The parachute canopy release assembly of claim 2, comprising a pull release extending from a front portion of the parachute canopy release assembly, the pull release coupled to the cable and configured to apply the force to the cable.

4. The parachute canopy release assembly of claim 2, comprising a pull release extending from a side portion of the parachute canopy release and pivotally coupled to the frame assembly, the pull release configured to apply the force to the cable.

5. The parachute canopy release assembly of claim 1, wherein the latch engaging end of the riser bar rotates from the locked state to the unlocked state.

6. The parachute canopy release assembly of claim 1, wherein movement of the lock member from the first state to the second state transitions the engagement of lock link member and the lock member from the first surface of the lock member to the second surface of the lock member, the coupling of the follower link to the lock link member causing the latch member to rotate and release the latch end of the riser bar from the latching member as the lock link member transitions from the first surface to the second surface.

7. The parachute canopy release of claim 6, comprising a cable coupled to the lock member, and a force on the cable generates the movement of the lock member from the first state to the second state.

8. The parachute canopy release assembly of claim 7, wherein the force is generated from a front of the parachute canopy release assembly or a side of the parachute canopy release assembly.

9. The parachute canopy release assembly of claim 1, wherein the latch engaging end of the riser bar includes an opening, the latch end of the latching member being retained within the opening in the locked state of the parachute canopy release assembly and wherein a rotation of the latching member moves the latch end of the latching member within the opening to release the latch engaging end of the riser bar from the latching member in the unlocked state of the parachute canopy release assembly.

10. The parachute canopy release assembly of claim 9, wherein the opening in the latch engaging portion of the riser bar comprises a first portion and a second portion, the first portion configured to engage the latch end of the latching member to retain the latch end within the opening, and a second portion configured to release the engagement of the latch end of the latching member from the opening.

11. The parachute canopy release assembly of claim 9, wherein a top end of the first upstanding member of the frame assembly includes an opening, the opening configured to receive the latch engaging end of the riser bar in the locked state of the parachute canopy release assembly.

* * * * *